US009048694B2

(12) United States Patent
Pan et al.

(10) Patent No.: US 9,048,694 B2
(45) Date of Patent: Jun. 2, 2015

(54) DC CONNECTION SCHEME FOR WINDFARM WITH INTERNAL MVDC COLLECTION GRID

(75) Inventors: Jiuping Pan, Raleigh, NC (US); Li Qi, Cary, NC (US); Jun Li, Raleigh, NC (US); Muhamad Reza, Vasteras (SE); Kailash Srivastava, Vasteras (SE)

(73) Assignee: ABB RESEARCH LTD, Zurich (CH)

( * ) Notice: Subject to any disclaimer, the term of this patent is extended or adjusted under 35 U.S.C. 154(b) by 674 days.

(21) Appl. No.: 13/363,574

(22) Filed: Feb. 1, 2012

(65) Prior Publication Data

US 2013/0197704 A1 Aug. 1, 2013

(51) Int. Cl.
| B63H 3/10 | (2006.01) |
| G06Q 50/06 | (2012.01) |
| H02J 3/00 | (2006.01) |
| H02J 3/38 | (2006.01) |

(52) U.S. Cl.
CPC ...................... *H02J 3/386* (2013.01)

(58) Field of Classification Search
CPC . Y02E 10/723; Y02E 10/72; H02P 2009/004; B63H 3/10; G06Q 50/06; H02J 3/00; H02J 13/0086
USPC ............... 700/286, 287, 297, 298; 290/44, 55
See application file for complete search history.

(56) References Cited

U.S. PATENT DOCUMENTS

| 7,633,770 B2 | 12/2009 | Datta et al. | 363/35 |
| 7,863,766 B2 * | 1/2011 | Abolhassani et al. | 290/44 |
| 7,880,419 B2 * | 2/2011 | Sihler et al. | 318/504 |
| 7,969,755 B2 * | 6/2011 | Davies et al. | 363/35 |
| 8,044,537 B2 * | 10/2011 | Asplund et al. | 307/82 |

(Continued)

FOREIGN PATENT DOCUMENTS

| EP | 2 341 594 A1 | 7/2011 | H02J 3/36 |
| WO | WO 01/52379 A2 | 7/2001 | H02J 3/36 |
| WO | WO2011033308 * | 3/2011 | H02J 3/36 |

OTHER PUBLICATIONS

A Case for Medium Voltage Direct Current (MVDC) Power for Distribution Applications; IEEE-PES Power Systems Conference and Exposition; Mar. 23, 2011—Phoenix, AZ.; 21 pages of presentation slides; printed from the Internet on Sep. 30, 2014.*

(Continued)

*Primary Examiner* — Ronald Hartman, Jr.
(74) *Attorney, Agent, or Firm* — Renner Kenner Greive Bobak Taylor & Weber

(57) ABSTRACT

Connection schemes for offshore power generation with an internal collection grid include a power generation system which includes a plurality of generator-rectifier subsystems. The scheme further includes a medium voltage DC (MVDC) collection network with positive pole cables and negative pole cables connected to the DC outputs of the generator-rectifier subsystems. At least one offshore substation includes a positive bus bar and a negative bus bar correspondingly connected to the positive pole cables and negative pole cables of the MVDC collection network and a plurality of main DC-DC converters. Each main DC-DC converter includes multiple modules connected to the MVDC bus bars and each module has a positive and a negative output such that the modules' outputs are serially connected to one another. The schemes may also include a high voltage DC (HVDC) transmission system connected to the modules' outputs and at least one DC/AC converter at an onshore substation.

17 Claims, 9 Drawing Sheets

(56) References Cited

U.S. PATENT DOCUMENTS

| | | | | |
|---|---|---|---|---|
| 8,405,251 | B2* | 3/2013 | Barton et al. | 307/84 |
| 8,692,408 | B2* | 4/2014 | Zhang et al. | 307/12 |
| 2006/0097519 | A1 | 5/2006 | Steinke | 290/44 |
| 2008/0252142 | A1* | 10/2008 | Davies et al. | 307/42 |
| 2009/0146603 | A1* | 6/2009 | Sihler et al. | 318/812 |
| 2009/0212568 | A1 | 8/2009 | Maibach et al. | 290/44 |
| 2009/0273956 | A1 | 11/2009 | Castelli Dezza et al. | 363/67 |
| 2010/0292852 | A1* | 11/2010 | Gertmar et al. | 700/287 |
| 2011/0049994 | A1 | 3/2011 | Hiller et al. | 307/82 |
| 2012/0101643 | A1* | 4/2012 | Kirchner et al. | 700/287 |
| 2012/0116841 | A1* | 5/2012 | Bippert et al. | 705/7.31 |
| 2012/0136494 | A1* | 5/2012 | Kirchner et al. | 700/287 |
| 2012/0267955 | A1* | 10/2012 | Zhan et al. | 307/31 |

OTHER PUBLICATIONS

International Search Report mailed May 23, 2014 in corresponding application No. PCT/US2013/024254.

Written Opinion mailed May 23, 2014 in corresponding application No. PCT/US2013/024254.

*Wind Farm Configuration and Energy Efficiency Studies—Series DC versus AC Layouts*: S. Lundberg; PhD Thesis; Chalmers University of Technology, Sweden, 2006.

*DC Connection for Large Scale Wind Farms*; Pan et al.; *9th* International Workshop on Large-Scale Integration of Wind Power into Power Systems; Oct. 2010.

*Overview of Multi-MW Wind Turbines and Wind Parks*; Liserre et al.; IEEE Transaction on Industrial Electronics, 2011.

*Medium Voltage Power Conversion Technology for Efficient Windpark Power Collection Grids*; Steimer et al; IEEE International Symposium on Power Electronics for Distributed Generation System; Jun. 2010.

*DC/DC Conversion Systems Consisting of Multiple Converter Modules: Stability, Control, and Experimental Verifications*; Chen et al: IEEE Transactions on Power Electronics; vol. 24, No. 6; Jun. 2009.

*Key Components for Future Offshore DC Grids*; Meyer; Institute for Power Electronics and Electrical Drives; RWTH Aachen University; Sep. 2007; ISBN: 978-3-8322-6571-7.

* cited by examiner

DC CONNECTION SCHEME FOR WINDFARM WITH INTERNAL MVDC COLLECTION GRID

TECHNICAL FIELD

Generally, the present invention relates to a direct current (DC) connection system for large-scale offshore wind farms. Specifically, the present invention is related to a high-voltage direct current (HVDC) transmission scheme with an internal medium voltage direct current (MVDC) collection grid within the offshore windfarm. More particularly, the present invention relates to providing a reliable and efficient DC connection scheme for large-scale offshore windfarms which involves a HVDC transmission system for grid interconnection and an internal MVDC grid for wind power collection.

BACKGROUND ART

A typical large-scale offshore wind power plant (sometimes referred to as a wind farm) architecture consists of wind turbines, a medium voltage collection system, an offshore substation, a high voltage transmission system and an onshore substation to interface with a main power grid. For close-to-shore wind power plants, high voltage AC (HVAC) transmission systems are used. For offshore wind power plants with long distances to shore, voltage source converter based high voltage DC (VSC-HVDC) systems have proven technically advantageous and cost-effective over conventional HVAC solutions.

Currently, the collection grid associated with a windfarm utilizes medium voltage alternating current (AC) networks typically at 33 kV. In such a configuration, step-up transformers are needed at both the wind turbines and at the offshore platform substation. The wind turbine step-up transformers increase the AC output power voltage from 690 volts or 3.3 kV to 33 kV of the collection grid. Step-up transformers at the offshore platform increase the AC power voltage from 33 kV to a transmission voltage of 150-245 kV and then transfer the wind power onshore by HVAC submarine cables or to the voltage level matching a AC/DC converter of the HVDC transmission system.

In a desire to improve system efficiency from wind turbine generators to grid connection points, it is believed that DC connection strategies could be extended from high voltage DC to the wind turbine generator outputs. Such a configuration and the resulting DC connection system could potentially reduce the total cost of the power converters and improve the overall system efficiency and performance. As a result, several DC connection systems have been developed and they can be categorized into various configurations. The first configuration is a DC system with two-stage DC/DC power conversion wherein DC-DC converters are used at the wind turbines and the offshore platform. The second configuration is a DC system with one stage DC/DC power conversion, wherein DC-DC converters are positioned at the offshore platform. A third configuration is a DC system with one stage DC/DC power conversion, wherein DC-DC converters are used at the wind turbine generators. A final configuration is a DC system with one stage DC/DC power conversion wherein DC-DC converters are at the wind turbine generators in a series connection. In the first embodiment described above a primary DC-DC converter is located at each wind turbine and is connected to a DC collection network and a secondary DC-DC converter is positioned at the offshore platform and is connected between the DC collection network and the HVDC transmission line. Another configuration utilizes a DC transmission and collection system with DC outputs of multiple wind turbine converters, each comprising an AC-DC converter and a DC-DC converter, coupled in series to the DC transmission line.

Although the aforementioned embodiments are improvements in the art, it is believed that the DC connection concepts requiring two-stage DC-DC power conversions may not be competitive to the conventional solutions with a MVAC collection grid and HVDC transmission system considering overall system efficiency, cost and maintenance requirements. Moreover, the DC connection concepts with the series connection of wind turbines to reach the voltage level of HVDC transmission may not be feasible because of known technical issues. For example, such a DC connection concept with one stage distributed DC-DC conversion at the wind turbine may have limited applications because it is not practical to require HVDC insulation at wind turbines.

Therefore, there is a need in the art for a DC connection scheme with one stage centralized DC-DC power conversion. In particular, there is a need for a DC connection scheme that embodies a high range MVDC collection grid, in the range of 20 to 50 kV or higher, comprising multiple MVDC feeders and a MVDC bus bar system at the offshore platform. Indeed, there is a need for utilization of modular DC-DC converters for transferring high power from the MVDC collection system to a HVDC transmission system. In this regard, there are needs for control methods for operating modular DC-DC converters connected to the different MVDC bus sections to ensure balanced operation of the HVDC system.

SUMMARY OF THE INVENTION

In light of the foregoing, it is a first aspect of the present invention to provide a DC connection scheme for windfarm with internal MVDC collection grid.

It is another aspect of the present invention to provide a connection scheme for offshore power generation with an internal collection grid, comprising a power generation system including a plurality of generator-rectifier subsystems, the subsystems having at least one generator with an active rectifier, each active rectifier having a positive DC voltage output and a negative DC voltage output, a medium voltage DC (MVDC) collection network comprising positive pole cables and negative pole cables, and connected to the DC outputs of generator-rectifier subsystems, at least one offshore substation comprising a positive bus bar and a negative bus bar correspondingly connected to the positive pole cables and negative pole cables of the MVDC collection network, and a plurality of main DC-DC converters, each main DC-DC converter comprising multiple modules connected to the MVDC bus bars, each module having a positive output and a negative output such that the modules' outputs are serially connected to one another, and a high voltage DC (HVDC) transmission system comprising at least two DC transmission lines connected to the modules' outputs.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
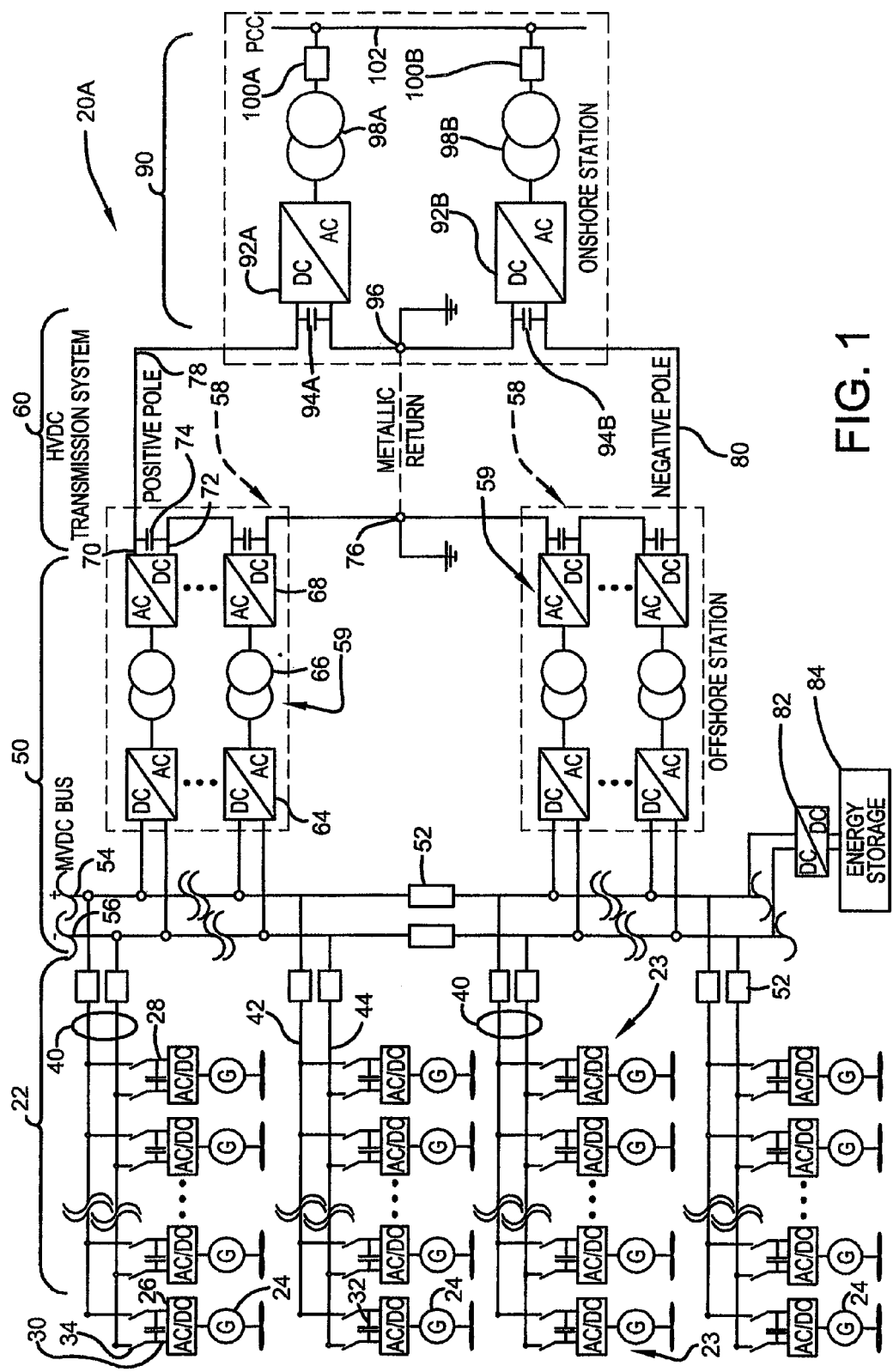
FIG. 1 is a schematic diagram of a DC connection scheme with an internal MVDC connection grid according to the concepts of the present invention.

Referring now to the drawings and in particular to FIG. 1, it can be seen that a power collection and transmission system which employs a connection scheme for offshore power generation with an internal collection grid is designated generally by the numeral 20A. Generally, the scheme shown in FIG. 1 comprises a rectifier unit for each wind turbine generator, a MVDC collection grid, a HVDC transmission system and at least two main DC-DC converters transferring power from the MVDC system to the HVDC transmission system. The system 20A includes a generation system 22 which utilizes any number of generator-rectifier subsystems 23. Each subsystem 23 includes at least one wind turbine generator 24 wherein each generator is associated with an AC/DC rectifier 26. Each rectifier 26 provides a positive voltage output 28 and a negative voltage output 30. Connected across the outputs is an energy storage circuit 32 and a switch mechanism 34 for connecting each subsystem to a feeder system 40. Each feeder system 40 includes a positive pole cable 42 and a negative pole cable 44 which may also be referred to as power collection cables.

The wind turbine generators 24 in the present embodiment are configured as permanent magnet synchronous generators (PMSG). Other embodiments could use wind turbine generators with full rating AC-DC converters. Active rectifiers 26 are used with most embodiments in order to obtain flexible control and maximum power output from the wind turbines through maximum power point tracking algorithms. The energy storage circuit 32 is connected in parallel with the DC output side of the rectifier 26. Each active rectifier comprises modular multi-level topology which has distributed energy storage and provides almost sinusoidal line-line voltage at the generator side.

The feeders 40 are connected to an offshore station designated generally by the numeral 50. Interposed between each feeder 40 and the station 50 may be DC breakers 52 wherein a breaker 52 is disposed between each pole cable 42, 44, respectively and a corresponding MVDC positive bus bar 54 and an MVDC negative bus bar 56. The bus bars 54,56 are connected to main DC/DC converters 58 wherein at least two main DC/DC converters are connected to one another in a manner to be described.

The offshore station 50 receives collected powers from multiple feeders and includes the aforementioned bus system comprising the bus bars 54 and 56. Generally, the wind turbine generators are connected to the collection feeders through their respective rectifier units. The power outputs from the turbine generators are aggregated at the MVDC bus and then boosted by the main DC-DC converters 58. The protection devices or DC breakers 52 on the common MVDC bus and the MVDC feeders may be in the form of semiconductor switches or mechanical type switches which allow for split MVDC bus operation and the ability to disconnect one MVDC feeder under maintenance or fault conditions.

Each main DC/DC converter 58 is a high powered DC-DC converter which consists of any number of lower power rating input parallel output series (IPOS) converter modules 59. The inputs of the converter modules 59 are connected in parallel to the common MVDC bus to share the high current generated from the wind turbine generators. The outputs of the converter modules 59 are connected in series to provide high DC voltage to a HVDC transmission system designated generally by the numeral 60. The series connection allows for each isolation transformer to be designed for a moderate transformation ratio. The IPOS DC/DC converter module 59 is self-stabilizing by current sharing at the input side and voltage sharing at the output side. Skilled artisans will appreciate that there are several possible DC/AC and AC/DC topologies to construct a DC/DC converter depending on the functionality requirements. In any event, the outputs of the first and second main DC/DC converters 58 are connected to positive and negative pole cables of HVDC transmission system 60 and their grounding is shared with the HVDC transmission system 60. Indeed, each converter module 59 comprises a DC/AC inverter 64 which receives input from the positive bus bar 54 and the negative bus bar 56. An output from the inverter 64 is input to a medium frequency (MF) transformer 66 whose output is connected to an AC/DC rectifier 68. The rectifier 68 generates a positive DC output 70 and a negative DC output 72. The rectifiers 68 are serially connected to one another. In other words, the negative output of one rectifier 68 is connected to a positive output of an adjacent rectifier 68. Skilled artisans will appreciate that an energy storage unit, such as a capacitor 74, is connected across the DC outputs of each rectifier 68. The negative output 72 of the last rectifier in a first series grouping of rectifiers or the first main DC/DC converter 58 is connected to ground 76. In a somewhat similar manner, the ground 76 is connected to a positive output 70 of a first AC/DC rectifier 68 in a second series grouping of rectifiers or the second main DC/DC converter 58. The positive output 70 of the first DC/DC converter module 59 in the first series grouping of rectifiers is connected to a positive pole cable 78 for the HVDC transmission system. A negative output 72 of a last serially connected DC/DC converter module 59 in the second series grouping of rectifiers is connected to a negative pole cable 80. Use of a common MVDC bus facilitates integration of the energy storage systems which provide black-start power supply of offshore wind farm after a black out or disconnection from main power grid and additional MVDC voltage regulation capability.

The bipole HVDC transmission system 60 interconnects the offshore windfarm to the main power grid or onshore station designated generally by the numeral 90. In particular, the positive pole and negative pole HVDC cables 78,80 are connected to DC/AC inverters 92. In particular, the positive pole cable 78 is connected to an input of one of the inverters 92A, while the other input of inverter 92A is connected to ground 96. In a similar manner, the negative pole cable 80 is connected to the inverter 92B, wherein the positive input of inverter 92B is connected to ground 96 and the negative input of inverter 92B is connected to the negative pole cable 80. The ground connection 96 is connected by metallic return to the ground connection 76 that is part of the offshore station 50. An energy storage circuit 94 is connected across the corresponding inputs for each inverter 92. The AC output of each inverter 92 is connected to a corresponding transformer 98 for matching the voltage level of main power grid 102 for further transmission and distribution through a point of common connection which is indicated as PCC in the drawings. Skilled artisans will appreciate that breakers 100 may be connected between the grid 102 and the appropriate transformer 98. In this embodiment, the connection scheme allows for a one stage centralized DC-DC converter for bipole HVDC transmission system.

In some embodiments, monopole operation is feasible under certain component re-configurations. For example, the system shown in FIG. 1 can be reconfigured to monopole operation mode for scheduled maintenance of one main DC-DC converter, one pole HVDC cable or one onshore DC-AC converter, or one MVDC bus section, or a combination of several components.

Figure 2:
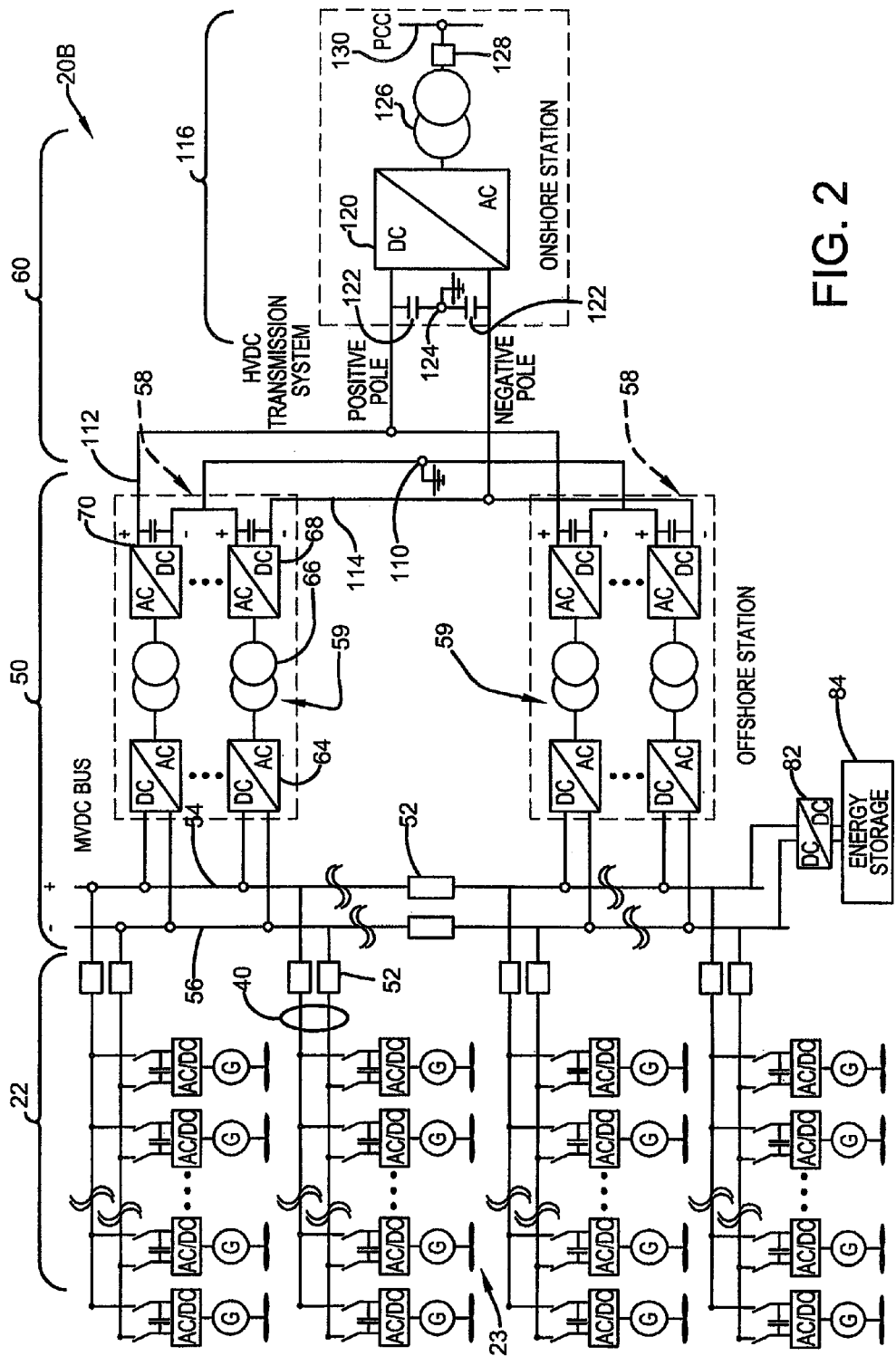
FIG. 2 is an alternative connection scheme and collection grid according to the concepts of the present invention.

As best seen in FIG. 2, the DC connection scheme is embodied in an alternative power collection and transmission system designated generally by the numeral 20B. The system 20B illustrates the ability to utilize a symmetric monopole HVDC system in contrast to the bipole HVDC system embodiment shown in FIG. 1. In this particular embodiment, the system 20B is configured such that a negative output of one of the converter modules 59 in a first series of modules and the positive output of one of the other converter modules in the same series of modules is connected to a ground connection 110. One of the positive outputs from a first and a second series of modules is connected to a positive pole cable 112, while one of the negative outputs from the first and second series of modules is connected to a negative pole cable 114. The HVDC transmission system 60 includes the positive pole cable 112 and the corresponding negative pole cable 114 and also the onshore substation 116.

In this embodiment an onshore substation 116 includes a single DC/AC inverter 120 which receives the positive pole cable 112 and the negative pole cable 114. Energy storage circuits 122 are connected across each pole cable and a ground termination 124 which is shared. The output of the inverter 120 is connected to a transformer 126 which in turn is connected to a breaker 128 for connection to a power grid 130. In this embodiment, the connection scheme allows for a one stage centralized DC-DC converter for symmetric monopole HVDC transmission system.

Figure 3:
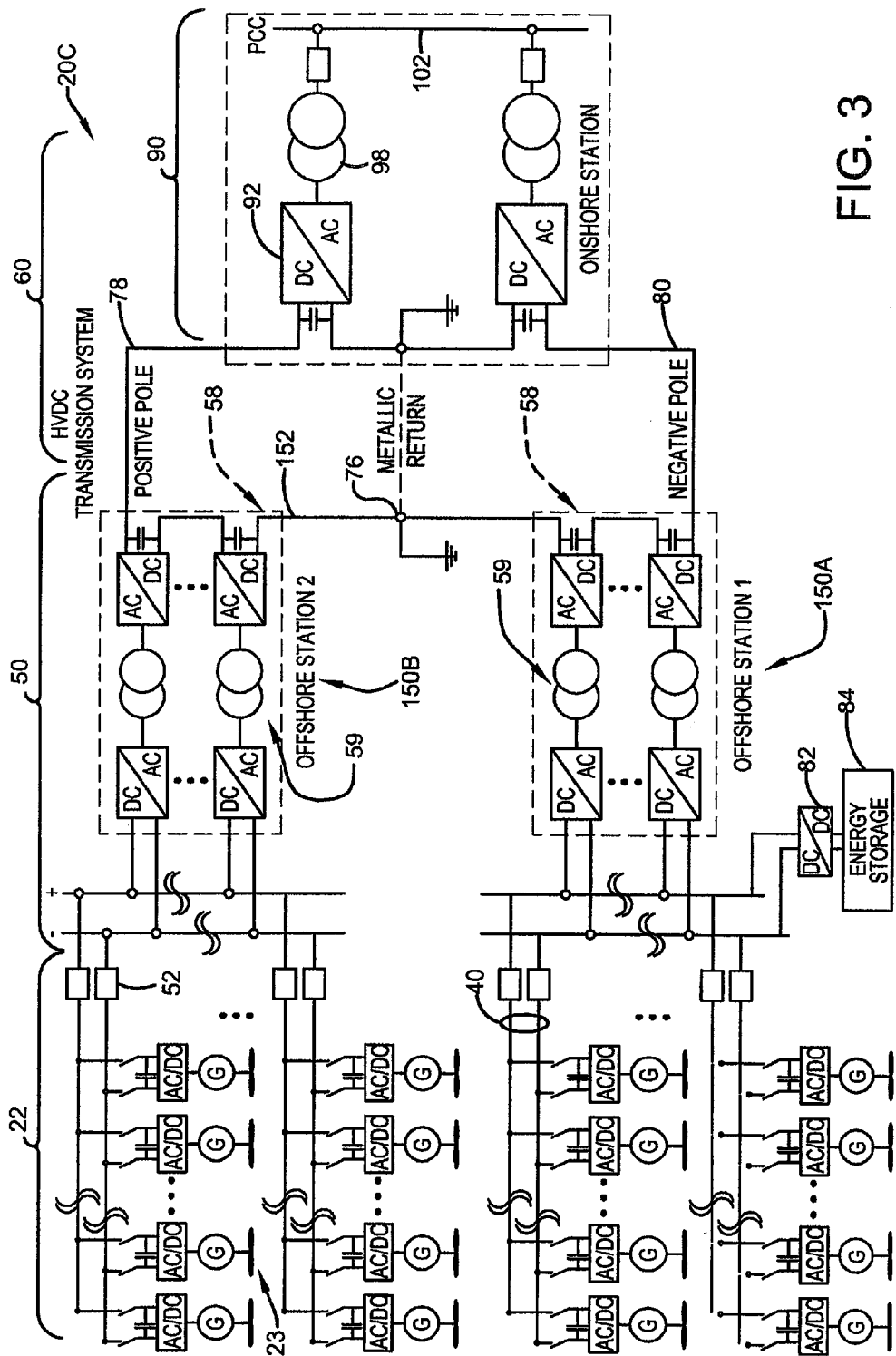
FIG. 3 is still another alternative connection scheme and collection grid according to the concepts of the present invention.

Referring now to FIG. 3, it can be seen that an alternative power collection and transmission system is designated generally by the numeral 20C. In this system, two offshore platform stations 150A,150B, each have respective main DC-DC converter 58. Multiple offshore platforms might be needed as large offshore windfarms may be developed in multiple stages or preferred for reliability and economic reasons. The DC connection may start from one offshore platform and a symmetric monopole HVDC transmission system. As the windfarm expands, a second offshore platform may be constructed and a third submarine cable may be added resulting in a bipole HVDC transmission system. In particular, the offshore station may be represented by numerals 150A and 150B, wherein a submarine or ground cable 152 links the stations 150 to one another. The connections between the transmission system 60 and the onshore station 90 are the same as the embodiment shown in FIG. 1.

High range MVDC electrical collection system

Figure 4:
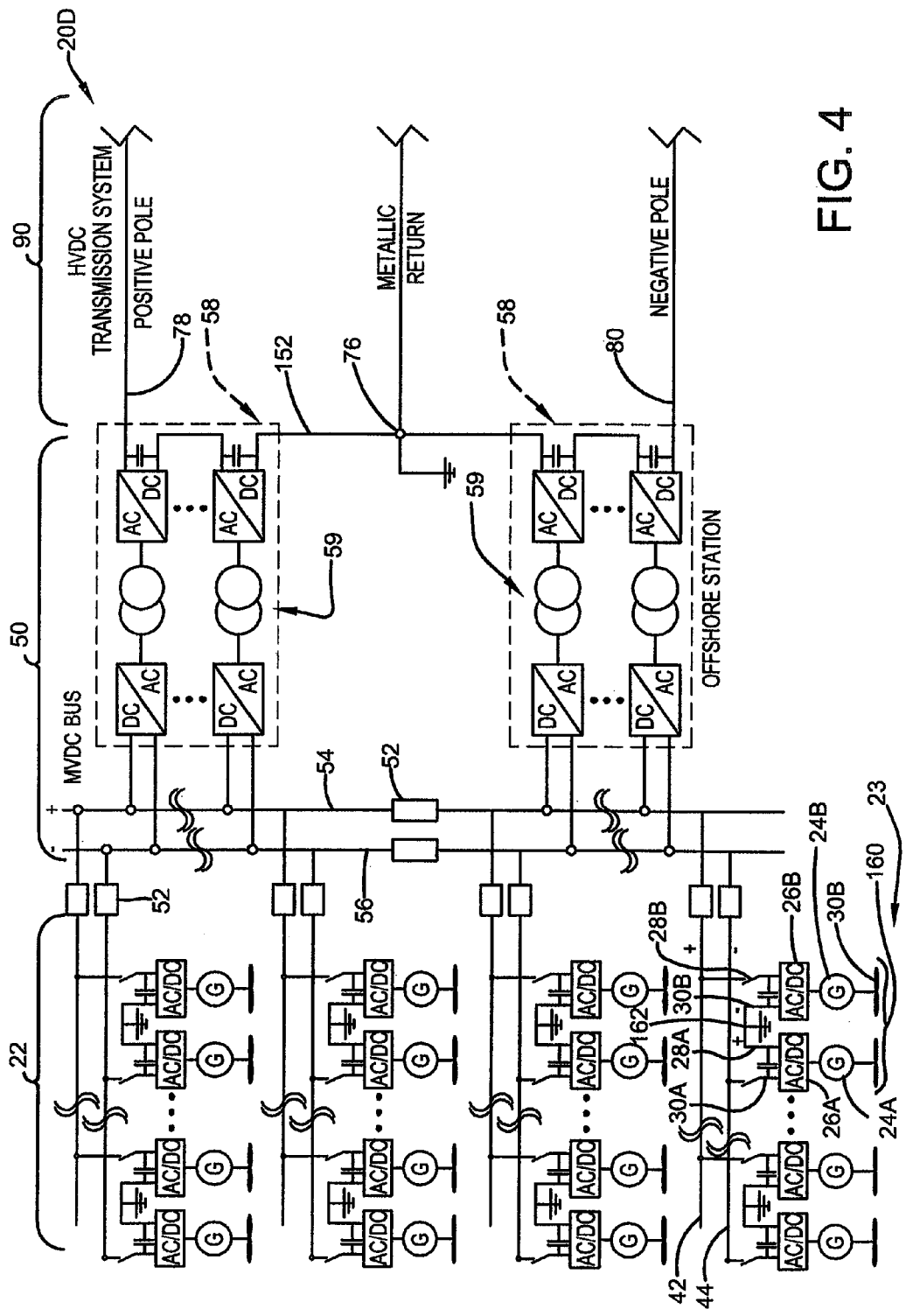
FIG. 4 is yet another alternative connection scheme and collection grid according to the concepts of the present invention.

Referring now to FIG. 4, yet another alternative power collection and transmission system is designated generally by the numeral 20D. In this embodiment, the generation system 22 comprises pairs of wind turbine generators 160 that are connected in series to one another through their corresponding rectifiers 26. In some embodiments there may be more than two generators in the system 22 and they are also connected in series. A ground connection 162 is provided between corresponding or adjacent positive and negative outputs of each rectifier associated with a generator 24 while the positive output of a first rectifier in the series is connected to the positive pole cable 42 and a negative output of a last rectifier in the series is connected to the negative pole cable 44, wherein the cables are part of the corresponding feeder system 40. These power collection cables, which are connected to other similarly connected generator pairs or groupings, are then connected to the MVDC bus and offshore station 50 as previously described for the other embodiments. This scheme allows for higher voltage levels of MVDC collection system with medium voltage wind turbine generator and converter technologies.

Figure 5:
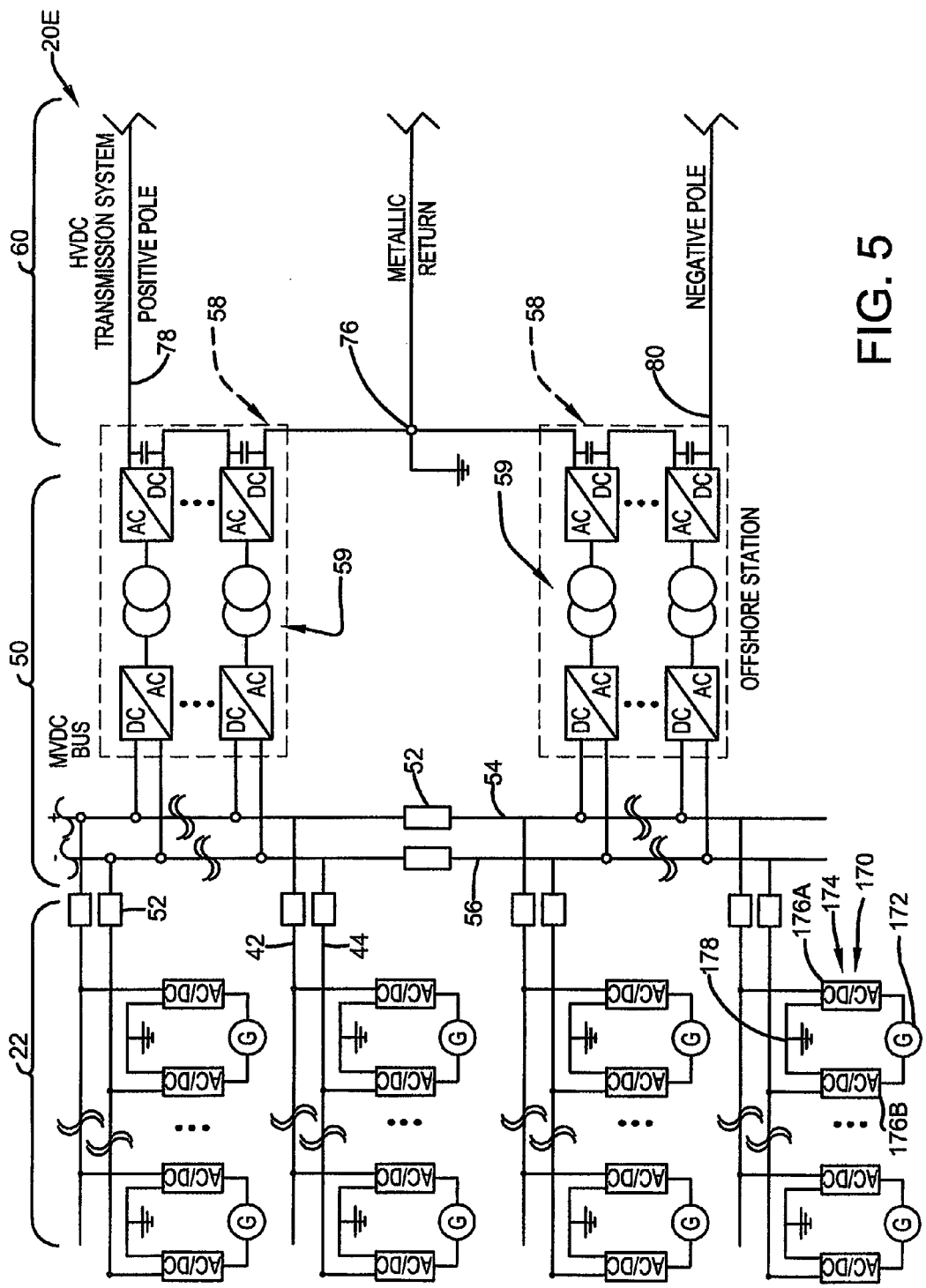
FIG. 5 is still yet another alternative connection scheme and collection grid according to the concepts of the present invention.

Referring now to FIG. 5, another power collection and transmission system is designated generally by the numeral 20E and utilizes a series connection of the DC outputs of the multi-phase machine rectifiers. In particular, the generator subsystem 22 is configured such that each generator substation is designated generally by the numeral 170. The subsystem 170 may employ power cell based modular converter topology for both AC/DC and DC/AC converters related to the MVDC collection system and HVDC transmission system. The capacitive or energy storage circuits are not needed at the DC output of rectifiers 176 if power cell based modular converter topology is used wherein distributed energy storage is used inside each power cell. Each generator 172 has a set of windings (two or more) connected to a corresponding AC/DC rectifier 176A and 176B which are connected in series. A positive output of rectifier 176B and a negative output of rectifier 176A are connected to ground 178, while also being serially connected to one another. A positive output of a first rectifier 176A is connected to the positive pole cable 42, whereas a negative output of a last rectifier 176B is connected to the negative pole cable 44. The cables 42 and 44, which are part of the feeder system 40, are connected to the substation 50 as previously described. This embodiment allows higher voltage levels in a MVDC collection system with medium voltage wind turbine generator and converter technologies.

Modular Main DC-DC Converter

For large offshore wind farms, modular main DC/DC converters are desired for various system design and operation considerations. The DC connection disclosed embodies a novel cross-connection arrangement of modular DC-DC converters for transferring high power from the MVDC system to HVDC transmission system.

Figure 6:
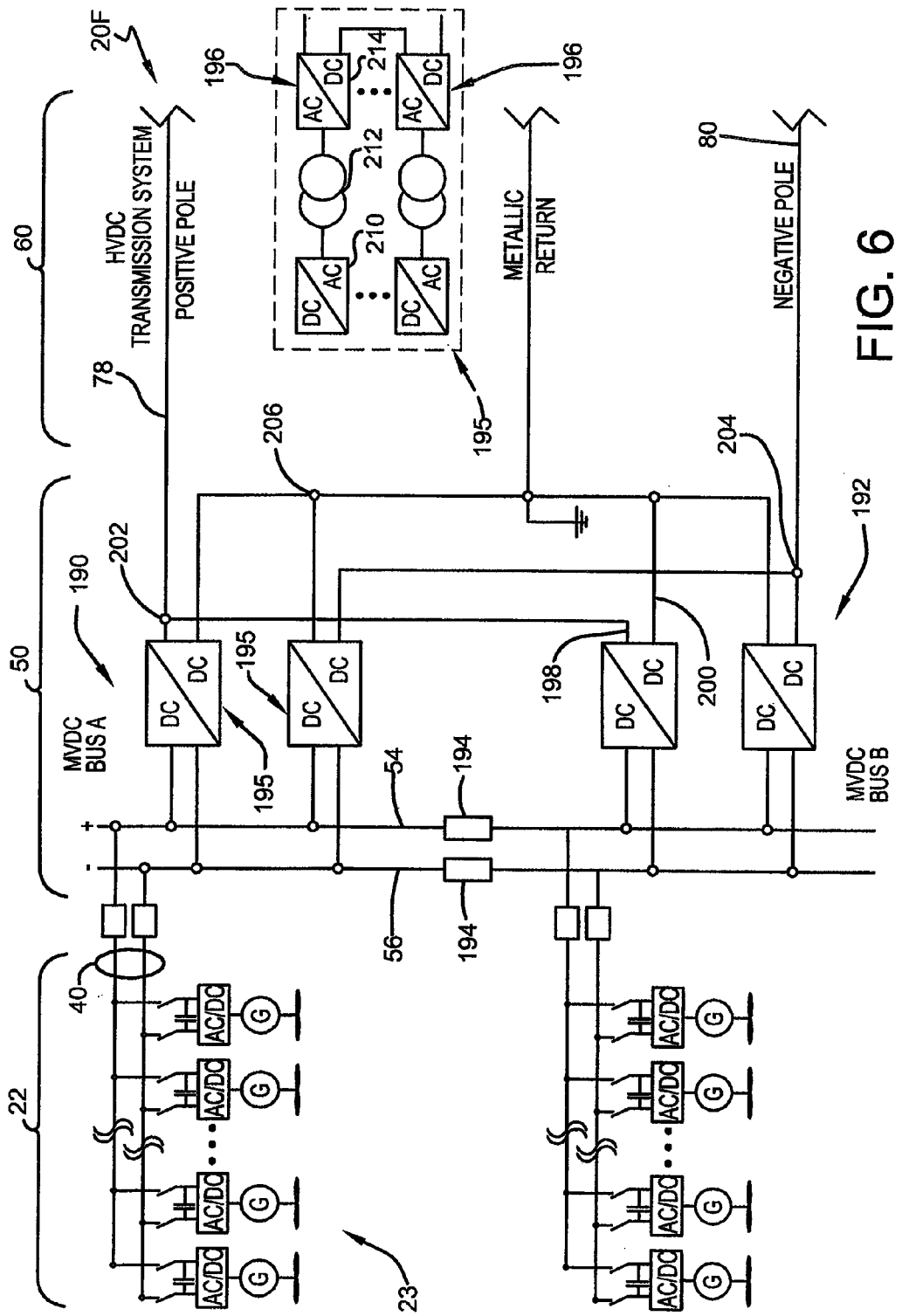
FIG. 6 is a further connection scheme and collection grid according to the concepts of the present invention.

Referring now to FIG. 6, it can be seen that a power collection and transmission system is designated generally by the numeral 20F. In this embodiment, the wind turbine generators 23 are individually connected to the respective feeder cables 40. Specifically, the wind turbine generators and the power collection cables 42 and 44 are connected to the offshore station 50 by a MVDC bus 190 and a MVDC bus 192. The buses each include a positive bus bar 54 connected to the positive pole collection cables 42, and a negative bus bar 56 connected to the negative pole collection cables 44. The bus bars 54 and 56 may each be separated by DC breakers or other protective means 194 so as to represent the fact that a group of wind turbine generators may be connected to separate buses and maintained by separate offshore stations 50. In any event, each bus 190/192 may be connected and input into at least one main DC/DC converter 195. As shown in the schematic, each main DC/DC converter 195 comprises several IPOS connected DC/DC converter modules 196. Each DC/DC converter module 196 comprises a DC/AC inverter 210, a transformer 212 and an AC/DC rectifier 214. Each main DC/DC converter 195 has a positive output 198 and a negative output 200. As shown, two main DC/DC converters 195 are connected in parallel between MVDC bus 190 and the HVDC system 160, and another two main DC/DC converters 195 are connected in parallel between the MVDC bus 192 and the HVDC system 60. A positive pole 78 of the HVDC transmission system 60 is connected to positive outputs of two main DC-DC converters wherein one converter is part of bus 190 and the other is part of bus 192, all of which are interconnected at node 202. In a somewhat similar manner, the negative pole cable 80 of the HVDC transmission system 60 is supplied by two negative outputs of main DC/DC converters 195, wherein one emanates from bus 190 and the other emanates from bus 192, all of which are interconnected at node 204. The main DC/DC converter 195 outputs not directly associated with cables 78 or 80 are connected to ground at node 206, which is connected to the metallic return between the offshore station and the onshore station as previously described.

If wind turbines are evenly connected to the two MVDC bus sections, the capacity rating of the main DC/DC converters should be identical. Otherwise, the main DC/DC converters connected to bus 190 or MVDC bus 192 may have different capacity ratings. In any event, with such a cross-connection arrangement, balanced operation of the bipole HVDC transmission system can be readily achieved under split MVDC bus operation conditions. This feature is important as the power aggregated at different MVDC bus sections may be quite different. Moreover, the cross-connection arrangement can be extended to the DC connection schemes that have multiple parallel main DC-DC converters between each MVDC bus section and the HVDC system 60. However, for the simplicity of control, it is desirable in system design to consider even number main DC-DC converters such that the power collected at each MVDC bus section can be easily transferred to the positive pole and the negative power of the HVDC transmission system. It should be pointed out that the proposed cross-connection arrangement of modular DC/DC converters may also be applied to symmetric monopole HVDC transmission system.

Figure 7:
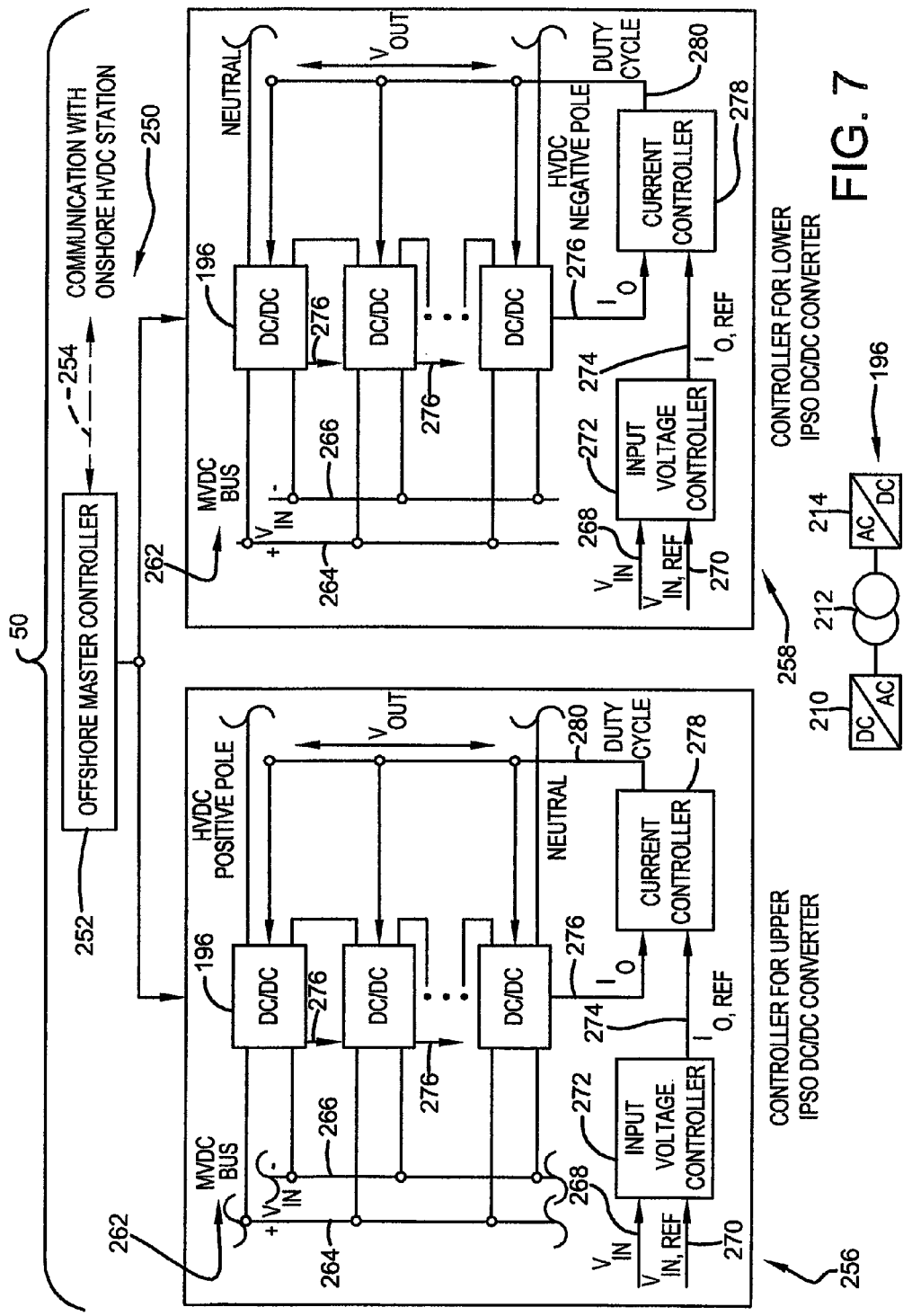
FIG. 7 is a control diagram utilizing a master controller according to the concepts of the present invention for association with the connection scheme shown in FIG. 1.

Referring now to FIG. 7, it can be seen that a control system designated generally by the numeral 250 may be part of an offshore substation 50, which in turn may be part of the power collection and transmission systems disclosed herein. The control system 250 includes an offshore master controller 252 which communicates with an onshore HVDC station via a signal line 254. In one embodiment, the control system 250 is associated with the system architecture shown in FIG. 1, i.e., system 20A. Generally, the control system keeps the common MVDC bus voltage constant and implements the power sharing among the DC-DC converter modules 196 based on a "common-duty-ratio" control logic. The overall system operation performance can be enhanced with coordinated control between the DC-DC converter modules 196 and the onshore DC-AC converter by the master controller 252 in communication with the offshore substation. It will further be appreciated that the DC connection scheme disclosed herein also embodies the control of main DC-DC converters to achieve balanced operation of a bipole HVDC transmission system or make the operation of symmetric monopole HVDC transmission feasible under split MVDC bus operation conditions.

In operation, the offshore master controller 252 is associated with a positive MVDC bus controller 256 and a negative MVDC bus controller 258. It will be appreciated that the controllers 252, 256, 258 and any other controller described herein includes the necessary hardware, software and memory to implement the functions and operations described. In any event, the controllers 256 and 258 are similarly configured, wherein each controller is associated with any number of DC/DC converter modules 196. The only significant distinction between the two controllers is that controller 256 controls the converter modules 196 that are connected to the HVDC positive pole cable and that controller 258 controls the converter modules 196 connected to the HVDC negative pole cable. A MVDC bus 262 includes a positive bus bar 264 and a negative bus bar 266. Each bus bar is connected to respective positive and negative inputs of the converter modules 196 as shown. Incorporated into the controller 256 is an input voltage controller 272 which receives a voltage in ($V_{in}$) value 268. The input voltage controller 272 also receives a voltage reference value $V_{in,ref}$ such that the controller generates a signal 274 $J_O$, ref. A current controller 278 receives the signal $I_{O,ref}$ 274 and a $I_O$ signal 276 from one of the converter modules 196. The current controller 278 receives the input signals 274 and 276 and generates a duty cycle signal 280 that is delivered to each of the converter modules 196. This provides for the coordinated control between the main DC converters and the onshore DC/AC inverter by virtue of the offshore master controller 252.

Figure 8:
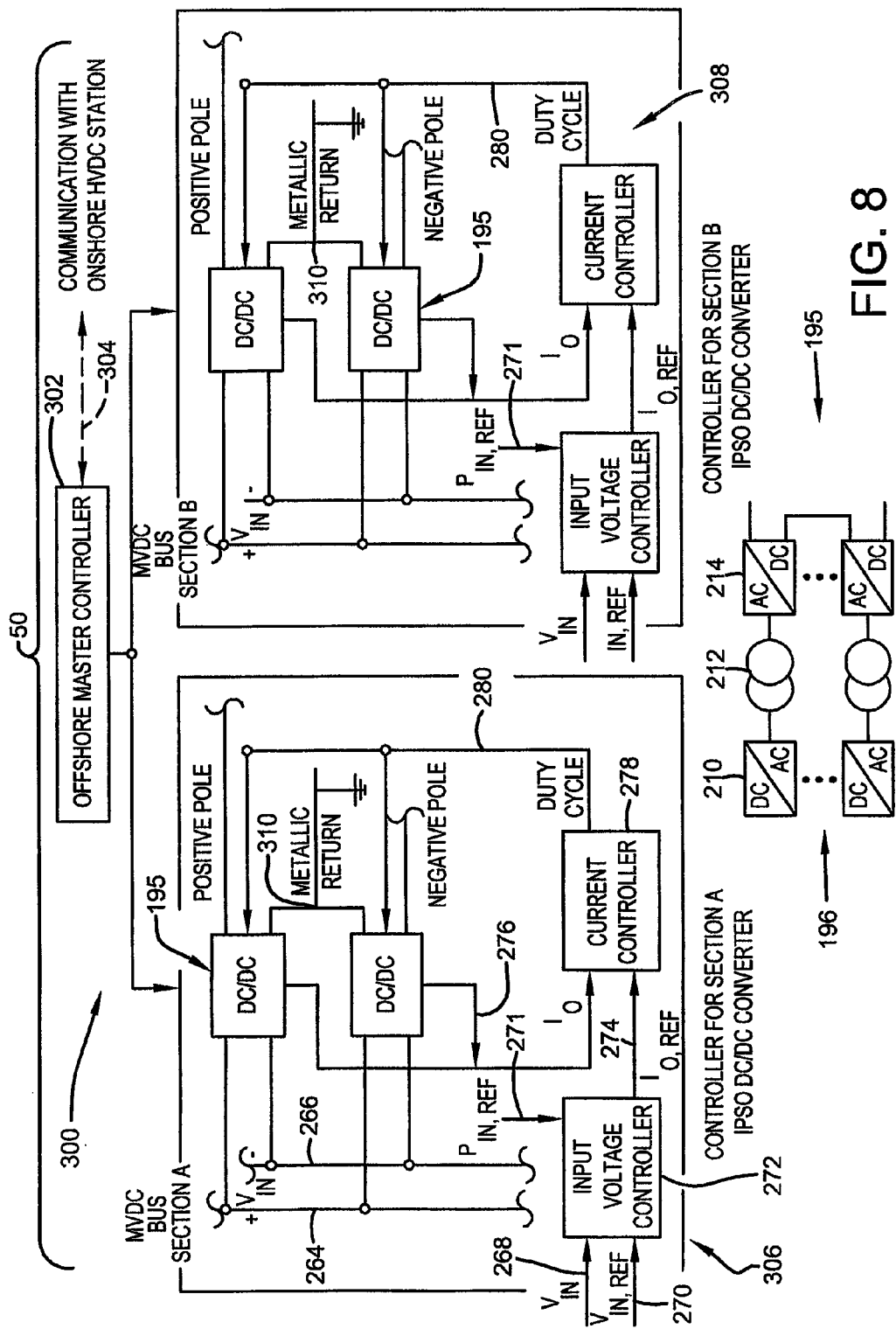
FIG. 8 is another control diagram utilizing an alternative controller for association with the connection scheme shown in FIG. 6.

Referring now to FIG. 8, an alternative control scheme designated generally by the numeral 300 is used with the cross connection power scheme shown in FIG. 6. Such an arrangement is similar to the one shown in FIG. 7, but each main DC/DC converter 195 in FIG. 8 represents an individual DC/DC converter consisting of multiple IPOS connected modules 196. These main DC/DC converters 195 are connected between HVDC positive/negative pole cables and metallic return (or ground node), and may have different power ratings. In this embodiment, the control scheme utilizes an offshore master controller 302 that is in communication with an onshore HVDC station by signal line 304. The master controller 302 provides input signals to MVDC bus controller 306 and 308. As can be seen, both controllers 306 and 308 utilize an input voltage controller 272 and a current controller 278 similar to the embodiment as described previously, wherein the current controller 278 generates a duty cycle signal 280. In addition, the input voltage controller 272 also receives a power reference $P_{in\_ref}$ signal 271 which defines how the power should be shared among the main DC/DC converters connected to the same MVDC bus section. Each main DC/DC converter 195 receives the duty cycle signal 280, but wherein one of the DC/DC converters 195 associated with the MVDC bus controller 306 controls the converter modules 196 that are connected to positive HVDC pole and another DC/DC converter 195 controls the converter modules 196 connected to negative HVDC pole cable. Similarly, one of the DC/DC converters 195 associated with the bus controller 308 controls converter modules 196 connected to positive HVDC pole cable and another main DC/DC converter 195 controls the converter modules 196 connected to a negative pole cable. Those converter module outputs not directly connected to the positive pole or the negative pole cables are connected at a metallic return or ground node 310 as shown.

The control system 300 shows the control principle associated with the cross-connection arrangement of DC/DC converters as illustrated in FIG. 6. With multiple DC-DC converters 195 connected to each of the two MVDC bus sections, the input signals 268 ($V_{in}$), 270 ($V_{in\_ref}$) and 271 ($P_{in\_ef}$), the intermediate signals 274 ($I_{O,\,ref}$) and 276 ($I_O$), and the output signals 280 (duty cycles) are vectors. For example, the input $I_o$ of the controller of IPOS DC-DC converters actually is a vector comprising current measurements of all DC-DC converters connected to the same MVDC bus section. Similarly, the output from the current controller gives a vector of the duty cycles, to the DC-DC converters connected to the same MVDC bus section. The variable values in each vector may be different from each other due to different measuring points and different power references. As such, converter modules 196 inside different DC-DC converters 195 may implement different duty cycles. Therefore, skilled artisans will appreciate that the design features and control principals described above can be extended to the bipole HVDC connection schemes with multiple MVDC bus sections which may be located at different offshore platforms.

The DC connection scheme may be implemented with modular multi-level converter technologies for AC/DC converters, DC/DC converters and DC/AC converters. With these technologies, lumped energy storage circuits can be replaced by distributed energy storage circuits inside the converters. The proposed cross-connection arrangement and control of modular DC/DC converters can also be applied to symmetric monopole HVDC transmission system.

Figure 9:
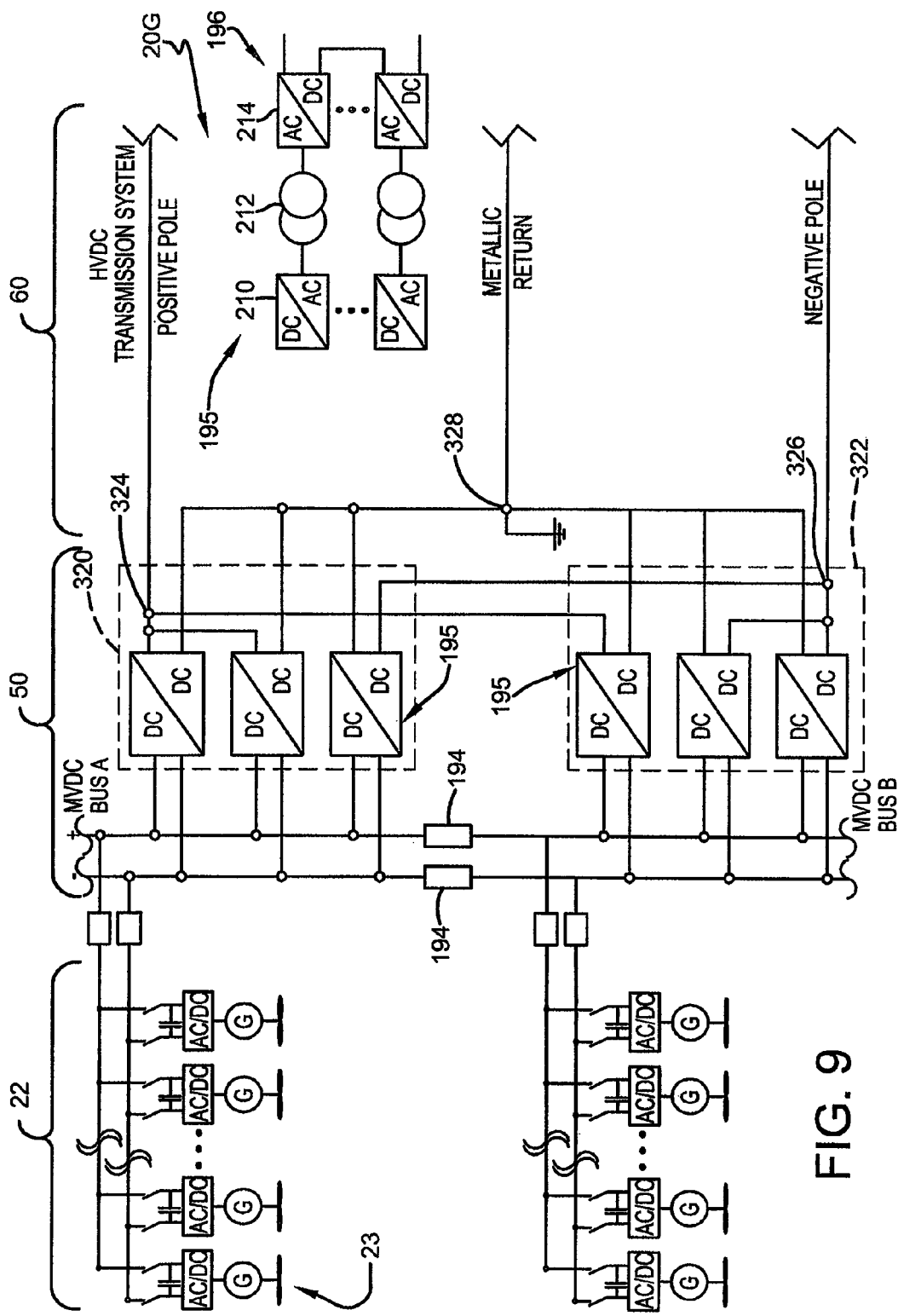
FIG. 9 is still another connection scheme for a collection grid according to the concepts of the present invention.

Still yet another power collection and transmission system embodiment is shown in FIG. 9, and designated generally by the numeral 20G. In this embodiment a tri-group 320 of modular DC/DC converters 195 is provided in MVDC bus A and a tri-group 322 of modular DC/DC converters 195 is connected with another MVDC bus B. In such an arrangement, three main DC-DC converters 195 in tri-group 320 are connected in parallel between MVDC bus A and the HVDC system 60. And the other three main DC-DC converters 195 in tri-group 322 are connected in parallel between MVDC bus B and the HVDC system 60. Each main DC-DC converter shown represents a DC-DC converter with multiple IPOS DC-DC converter modules 196.

As shown in FIG. 9, the positive pole of the HVDC transmission system is supplied by three DC-DC converters 195, wherein positive outputs from two converters in tri-group 320 and a positive output from one of the converters 195 in tri-group 322 are connected to a positive pole cable of the HVDC transmission system at node 324. In a somewhat similar manner, negative outputs from two converters 195 in tri-group 322 and a negative output from one of the converters in tri-group 320 are connected to a negative pole cable of the HVDC transmission system at the node 326. All the other positive and negative outputs in tri-groups 320 and 322 not otherwise connected to the positive or negative pole cables are connected to a metallic return or ground node 328. For such a cross-connection arrangement, the control of modular DC-DC converters for balanced operation of bipole HVDC transmission systems may be more complicated than the other embodiments described.

Based upon the embodiments disclosed herein the advantages of the schemes and control system associated therewith are numerous. Primarily, the schemes disclosed provide a practical, high efficient and high density DC connection scheme of large offshore windfarms with one stage DC-DC power conversion. Additionally, an improved system availability over the prior art solution is provided due to the minimized counts of wind turbine electrical components. And the schemes disclosed provide for balanced power transfer from MVDC collection systems to a HVDC transmission system through a novel arrangement and advanced control of modular IPOS DC-DC converters.

Such systems can be utilized for large offshore windfarms at several hundred MW power levels or higher and in long distance to the onshore grid connection point, voltage source converter (VSC) based high voltage direct current transmission systems so as to provide technically advantageous and cost-effective embodiments over conventional HVAC transmission. It is believed that such embodiments in addition to allowing for compact converter stations and flexible voltage and frequency control, will allow for establishment of multi-terminal HVDC systems to connect multiple offshore windfarms to different AC power grids or different portions of the same AC grid, thereby allowing optimized utilization of wind power in a broad regional scope.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A connection scheme for offshore power generation with an internal collection grid, comprising:
   a power generation system including a plurality of generator-rectifier subsystems, said subsystems having at least one generator with an active rectifier, each said active rectifier having a positive DC voltage output and a negative DC voltage output;
   a medium voltage DC (MVDC) collection network comprising positive pole cables and negative pole cables, and connected to said DC outputs of generator-rectifier subsystems;
   at least one offshore substation comprising:
      a positive bus bar and a negative bus bar correspondingly connected to said positive pole cables and negative pole cables of said MVDC collection network; and
      a plurality of main DC-DC converters, each said main DC-DC converter comprising multiple modules connected to said MVDC bus bars, each said module having a positive output and a negative output such that said modules' outputs are serially connected to one another; and
   a high voltage DC (HVDC) transmission system comprising at least two DC transmission lines connected to said modules' outputs.

2. The scheme according to claim 1, wherein said generator-rectifier sub-system comprises:
   at least two turbine generators;
   an active AC/DC rectifier associated with each of said turbine generators, each said rectifier having a positive DC output and a negative DC output, wherein said DC outputs of AC/DC rectifiers are connected to each other in series, wherein a positive output of a first AC/DC rectifier is connected to one of said positive pole cables in a feeder system, and a negative output of a last AC/DC rectifier is connected to said negative pole cable in a feeder system.

3. The scheme according to claim 1, wherein said generator-rectifier subsystem comprises:
   a single turbine generator having at least two sets of stator windings;
   an active AC/DC rectifier associated with each set said generator windings, each said AC/DC rectifier having a positive DC output and a negative DC output, wherein said DC outputs of AC/DC rectifiers are connected to each other in series, wherein positive output of a first AC/DC rectifier is connected to one of said positive pole cables in a feeder system, and a negative output of a last AC/DC rectifier is connected to said negative pole cable in said feeder system.

4. The scheme according to claim 1, wherein said active rectifiers comprise modular multi-level converter topology which has distributed energy storage inside and provides almost sinusoidal line-line voltage at generator side.

5. The scheme according to 1, wherein said MVDC collection network comprises multiple feeders, each said feeder comprising one of said positive pole cables and one of said negative pole cables, and said feeder connecting to at least one said generator-rectifier subsystem.

6. The scheme according to claim 1, further comprising:
a high voltage transmission system comprising a HVDC positive pole cable connected to said positive output of one said main DC/DC converters, and a HVDC negative pole cable connected to said negative output of another of said main DC/DC converters.

7. The scheme according to claim 1, wherein said plurality of main DC-DC converters are connected in parallel to said positive and negative bus bars.

8. The scheme according to claim 1, further comprising:
a high voltage transmission system comprising a HVDC positive pole cable connected to said positive output of one said main DC/DC converters, a HVDC negative pole cable connected to said negative output of another said main DC/DC converters, and a return cable connected to a negative output of one of said main DC/DC converters and a positive output of another of said main DC/DC converters different than said positive and negative outputs connected to said HVDC pole cables.

9. The scheme according to claim 1, further comprising:
an onshore station comprising:
a positive pole DC/AC converter connected to a positive pole HVDC cable;
a negative pole DC/AC converter connected to a negative pole HVDC cable;
two parallel three-phase converter transformers connected to said positive and negative pole converters and to a main power grid, wherein said HVDC transmission system comprises said positive pole and negative pole HVDC cables.

10. The scheme according to claim 9, wherein said pole DC/AC converters each have a positive DC terminal and a negative DC terminal, wherein said negative terminal of said positive pole converter and said positive terminal of said negative pole converter are connected together and grounded.

11. The scheme according to claim 1, further comprising:
an onshore station comprising a single DC/AC converter connected to HVDC positive and negative pole cables wherein said HVDC transmission system comprises said positive pole and negative pole HVDC cables.

12. The scheme according to claim 1, wherein said offshore substation further comprises:
an energy storage system connected to said bus bars.

13. The scheme according to claim 1, wherein said plurality of main DC-DC converters are connected in parallel to said positive and negative bus bars, said scheme further comprising:
a ground connection connected to a negative output of one of said main DC-DC converters and a positive output of another said main DC-DC converters different than said positive and negative outputs connected to said HVDC transmission lines.

14. The scheme according to claim 1, wherein said at least one offshore substation comprises one offshore substation with two MVDC bus sections, wherein each MVDC bus section comprises at least two main DC/DC converters,
the scheme further comprising:
a high voltage transmission system having a HVDC positive pole cable and a HVDC negative pole cable, wherein said at least one main DC/DC converter from said both first and second MVDC bus sections are connected in parallel to said HVDC positive pole cable and said at least one main DC/DC converter from said both first and second MVDC bus sections are connected in parallel to said HVDC negative pole cable.

15. The scheme according to claim 1, wherein said at least one offshore substation comprises:
two offshore substations;
wherein each offshore substation comprises at least two main DC/DC converters:
the scheme further comprising:
a high voltage transmission system having a HVDC positive pole cable and a HVDC negative pole cable, wherein said at least one main DC/DC converter from both said first and second offshore substations are connected in parallel to said HVDC positive pole cable and said at least one main DC/DC converter from both said first and second offshore substations are connected in parallel to said HVDC negative pole cable.

16. The scheme according to claim 1, further comprising:
a master controller connected to a substation controller associated with each said offshore substation, each said offshore substation having at least two main DC/DC converters connected in parallel between said bus bars and HVDC transmission lines, and each said main DC/DC converter generating an $I_o$, each said substation controller comprising:
an input voltage controller receiving a $V_{in}$ signal and a $V_{in,ref}$ signal and generating an $I_{o,ref}$ signal; and
a current controller receiving said $I_o$ signal and said $I_{o,ref}$ signal, said current controller generating a duty cycle signal for receipt by each said main DC/DC converter.

17. The scheme according to claim 1, further comprising:
a master controller connected to a substation controller associated with each said offshore substation, each said offshore substation having at least two MVDC bus sections and at least two main DC/DC converters connected in parallel between each said MVDC bus section and said HVDC transmission lines, and each said main DC/DC converter generating an $I_o$, each said substation controller comprising:
an input voltage controller receiving a $V_{in}$ signal, a $V_{in,ref}$ signal and a $P_{in\_ref}$ vector singal, and generating an $I_{o,ref}$ vector signal; and
a current controller receiving said $I_o$ vector signal and said vector $I_{o,ref}$ signal, said current controller generating a duty cycle vector signal for receipt by said main DC/DC converters.

* * * * *